United States Patent [19]
Church

[11] Patent Number: 6,067,849
[45] Date of Patent: May 30, 2000

[54] TIRE REPAIR WORK STATION

[76] Inventor: Clyde M. Church, 2342 E. Menlo St., Mesa, Ariz. 85213

[21] Appl. No.: 09/052,111

[22] Filed: Mar. 31, 1998

[51] Int. Cl.[7] ........................... E01C 23/00; B29D 30/58; B60C 25/00
[52] U.S. Cl. .............................. 73/146; 156/126; 157/1.1
[58] Field of Search ........................... 73/146; 254/50.2, 254/50.3, 50.4; 118/321, 320, 318; 156/126; 198/19, 678.1, 680, 682, 465.4; 157/1.1

[56] References Cited

U.S. PATENT DOCUMENTS

| | | | |
|---|---|---|---|
| 3,843,888 | 10/1974 | Fox | 250/360 |
| 3,960,260 | 6/1976 | AZuma et al. | 198/19 |
| 4,304,619 | 12/1981 | Riggs | 156/126 |
| 4,621,671 | 11/1986 | Kane et al. | 157/1.1 |
| 4,678,163 | 7/1987 | Hjorth-Hansen | 254/50.2 |
| 5,094,284 | 3/1992 | Curcuri | 157/1.17 |
| 5,772,047 | 6/1998 | Bostjancic | 211/13.1 |

*Primary Examiner*—Max Noori
*Assistant Examiner*—Abdullahi Aw-Musse
*Attorney, Agent, or Firm*—Cahill, Sutton & Thomas P.L.C.

[57] ABSTRACT

A tire support structure capable of spreading the beads of a tire for inspection and repair is supported by a mechanism for raising and lowering the structure. This permits the structure to be positioned in a lower position at a convenient height for a worker in an adjoining working position and permits the structure to be raised to an elevated position for retrieving a tire from an overhead conveyor system or delivering a tire to the conveyor system. A work bench is preferably located adjacent the worker position for supporting tools and supplies for repairing the tire.

2 Claims, 2 Drawing Sheets

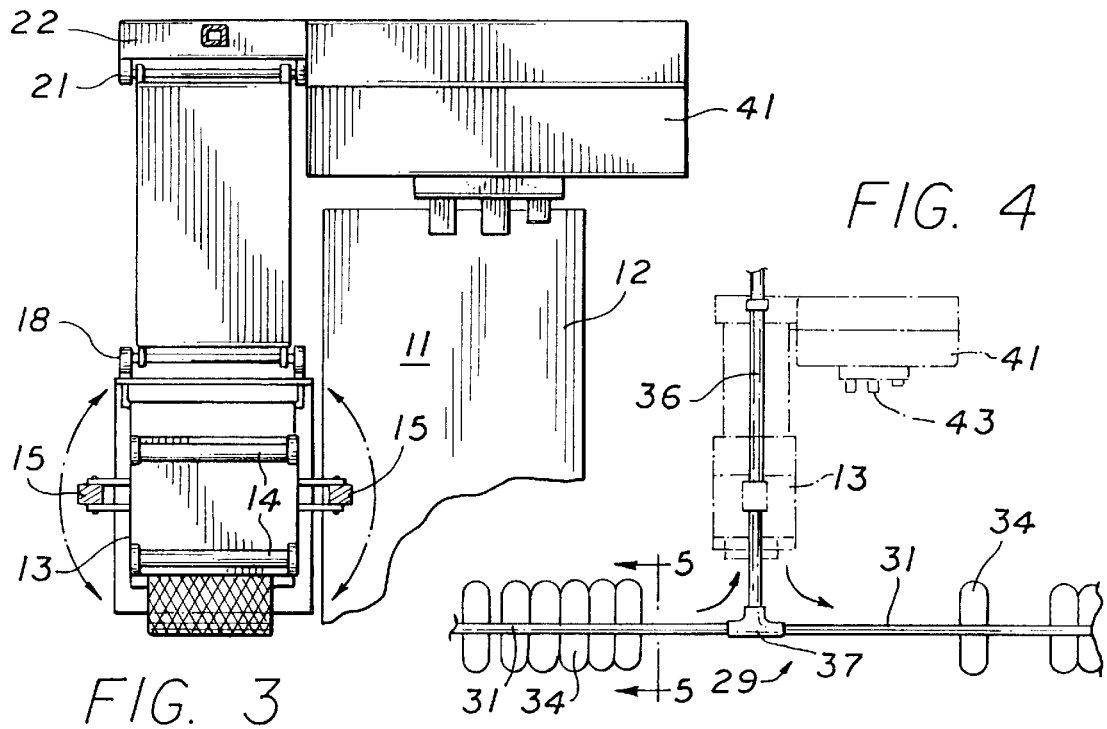
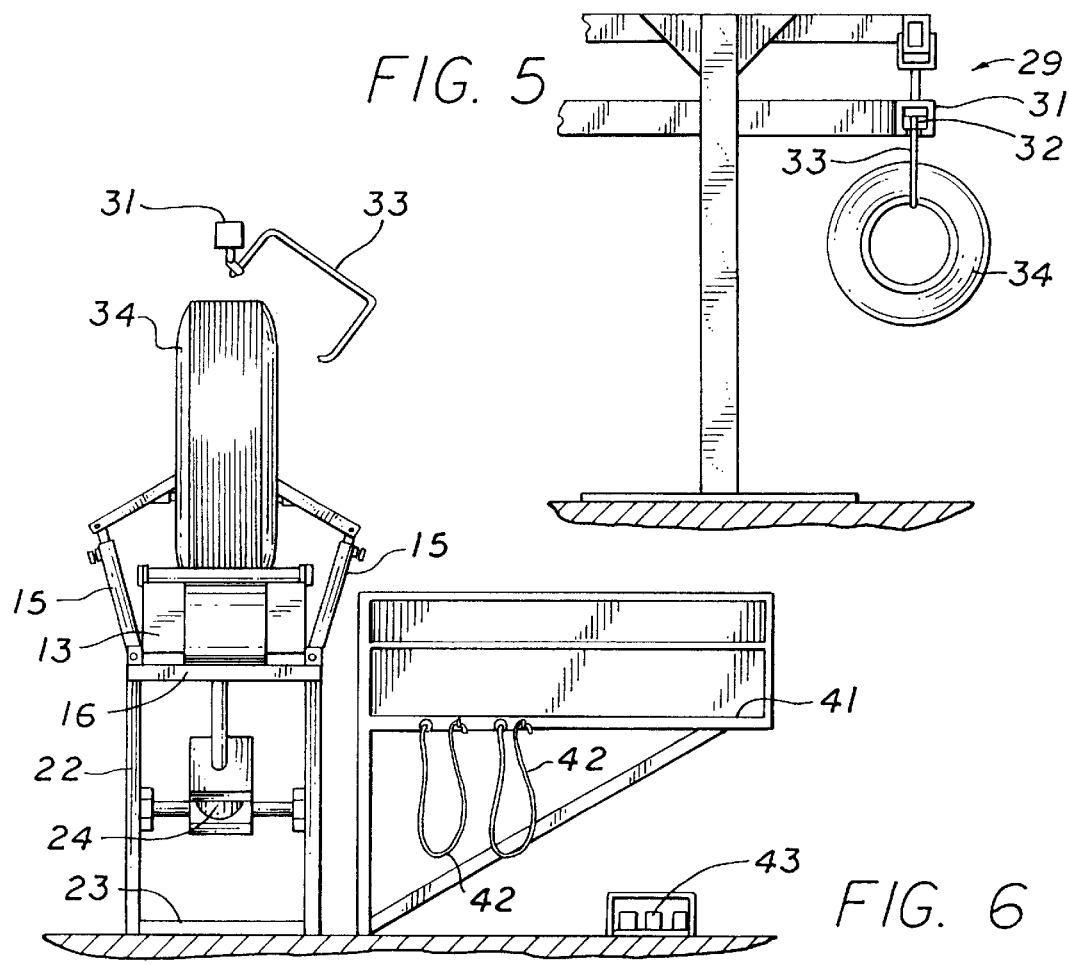

TIRE REPAIR WORK STATION

TECHNICAL FIELD

This invention is concerned with facilitating the handling of tires at a work station to which the tires are delivered and conveyed away from the station by an overhead mono-rail system.

BACKGROUND ART

The applicant has previously been granted three patents for apparatus employed in tire inspection and repair or reconditioning. U.S. Pat. No. 5,165,273 granted Nov. 24, 1992 and U.S. Pat. No. 5,562,773 granted Oct. 2, 1996 employ tire support structures which are lowered for loading and elevated to a working position. The tire support structure in patent No. 5,460,036 is positioned at a fixed height and rotatable to facilitate inspecting the tire.

In truck tire repair and retread facilities, because of the bulk and weight of the tires, they often are carried on J-hooks suspended from an overhead mono-rail system. Rollers on dollies within the mono-rail and connected to the J-hooks permit the tires to be pushed or pulled with relative ease through the facility.

The inspection apparatus disclosed in the aforementioned patents can be used in a mono-rail transport facility, but lifting heavy tires off and onto the elevated J-hooks is a real chore for the operator-inspector.

SUMMARY OF THE INVENTION

This invention provides a tire support structure along side a worker position and movable between a lower working position and an elevated position for receiving tires from and delivering tires to the J-hooks of the mono-rail system. The work station also preferably includes a work bench alongside the worker position with tools and supplies for treating tires.

BRIEF DESCRIPTION OF THE DRAWINGS

The invention is described in greater detail hereinafter by reference to the accompanying drawings, wherein:

FIG. 3 is a plan view of the work station;

FIG. 4 is a view from above of a mono-rail transport system for delivering tires to and from the work station;

FIG. 5 is a vertical sectional view of the mono-rail system; and

FIG. 6 is an elevational view from the front of the work station with the tire support structure elevated to receive a tire from the mono-rail transport system.

BEST MODES FOR CARRYING OUT THE INVENTION

Figure 1:
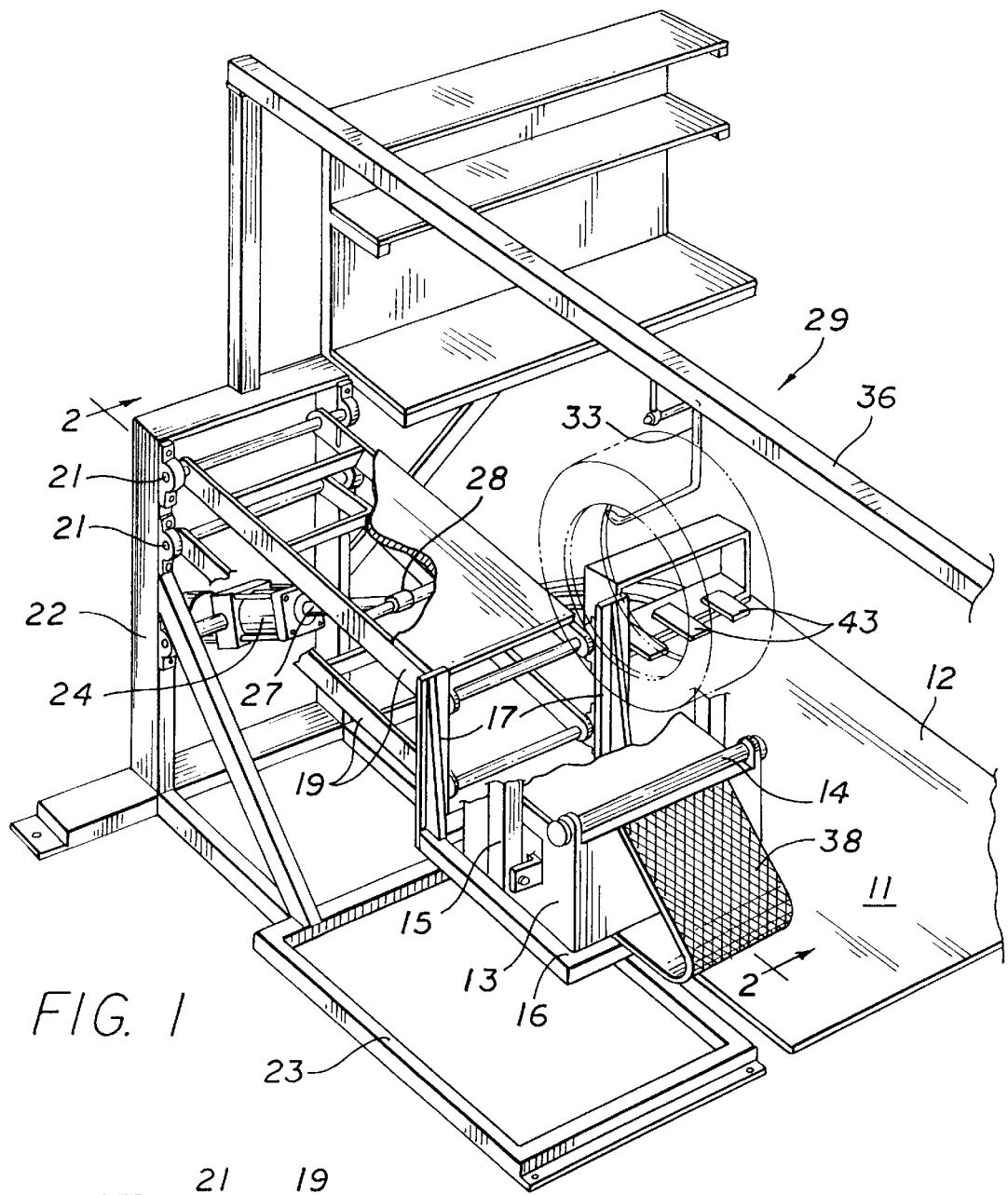
FIG. 1 is a perspective view from above of the tire inspection work station of this invention with portions broken away for clarity.

Referring particularly to FIGS. 1 and 3, reference numeral 11 designates a worker position which generally covers the same area as a floor mat 12. Along side the worker position 11 is a tire support structure 13 for supporting a tire for inspection and repair.

The upper portion of the tire support structure 13 carries a pair of rollers 14 permitting rotation of a tire about its axis.

The support structure 13 also includes a pair of oppositely acting spreader arms 15 for spreading apart the beads of the tire. Further details regarding the construction and operation of spreader arms 15 can be found in the aforementioned U.S. Pat. No. 5,165,273.

Figure 2:
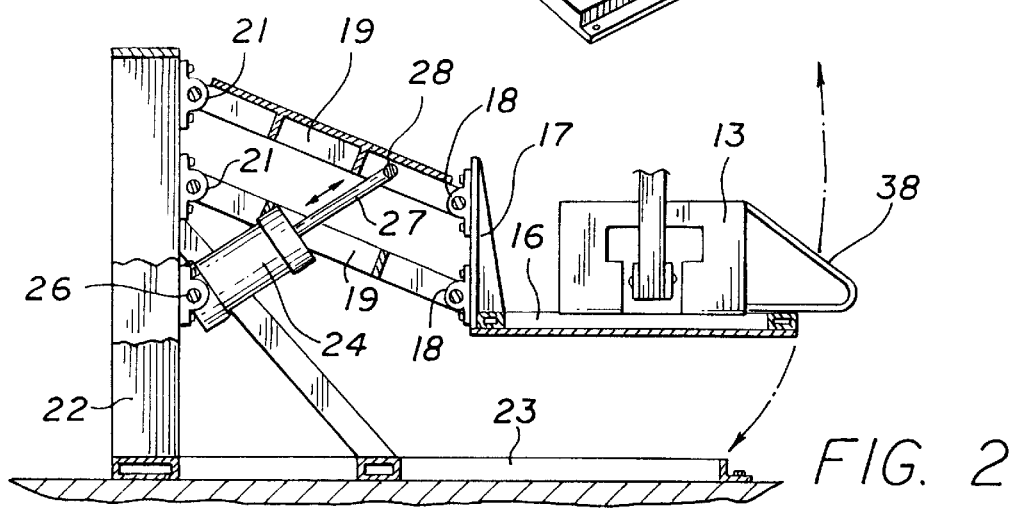
FIG. 2 is a vertical sectional view through the tire support structure of the work station, which view is taken generally as indicated by line 2—2 in FIG. 1.

Tire support structure 13 is mounted for pivotal movement about a vertical axis on a horizontal platform 16. Upright brackets 17 on the rear edge of platform 16 each carry a pair of bearings 18. (See FIG. 2) Pivotally carried in bearings 18 are the front ends of two pairs of parallelogram lift arms 19. The rear ends of these lift arms 19 are pivotally carried in two pairs of bearings 21 mounted on posts 22 of a floor mounted frame 23. The lift arms 19 permit the platform 16 with the tire support structure 13 thereon to be raised and lowered while maintaining a horizontal disposition.

Actual movement of platform 16 and tire support structure 13 is effected by a pneumatic cylinder 24 trunnion mounted in bearings 26 carried by posts 22. The distal end of piston rod 27 for cylinder 24 is pivotally connected at the upper arms of the pairs of lift arms 19. Extending piston rod 27 raises tire support structure 13. Retracting piston rod 27 lowers the tire support structure 13.

Tires are mounted to the vicinity of tire support structure 13 and removed therefrom following inspection and repair of the tire by an overhead mono-rail system designated generally by reference numeral 29 and shown in FIGS. 1, 4 and 5. This system comprises a main, hollow mono-rail 31 laid out to deliver tires in proper sequence to tire inspection and repair stations and retreading stations in the facility.

Riding inside mono-rail 31 are a plurality of wheeled dollies 32 carrying depending J-hooks 33 on which are suspended tires 34. At each tire work station in the facility the mono-rail system 29 has a spur rail 36 extending over the tire support structure 13. The spur rail 36 is connected to the main mono-rail 31 by a switch 37 which permits a tire 34 to be pulled from the main rail to a spur rail 36 and from a spur rail back onto the main rail 31.

To retrieve a tire 34 from spur rail 36 the platform 16 and tire support structure 13 are elevated until the tire is contacted and lifted by the support structure. This permits the operator to swing the J-hook 33 free of the tire and out of the way on the rail 36. Thereafter the support structure is lowered to a comfortable working height for the inspection/repair worker.

If the tire is determined to be damaged beyond repair the support structure 13 can be lowered close to the floor and the tire rolled off the support structure down a ramp 38 provided at the front of the support structure 13.

An inspected and repaired tire can be returned to the mono-rail system 29 by elevating the tire support structure 13 to a position in which a worker can put in place a J-hook 33 depending from spur rail 36. Mono-rail switch 37 is then positioned to permit the tire to be pulled out onto the main mono-rail 31 for further processing.

Integral with the tire inspection and repair work station of this invention is a work bench 41 in close proximity to the worker position 11 and near the tire support structure 13. The work bench 41 is designed to hold close at hand all of the repair tools and material required by the worker. For example, air hoses 42 may be suspended from the work bench for supplying air to pneumatic tools and a spray gun (not shown). At the base of bench 41 at the front thereof are the foot actuated controls 43 by which the operator can raise and lower the tire support structure 13, control rotation of that structure about a vertical axis and operate the bead spreader arms 15.

What is claimed is:

1. A tire repair work station comprising a worker position, an overhead monorail conveyor system including a plurality of depending J-hooks for carrying tires beneath the conveyor system in an upright position, said conveyor system delivering tires to and transporting tires away from the station at an elevation above a comfortable working height, a tire support structure along side the worker position, said structure supporting a tire in an upright position and having mechanisms for spreading apart the beads of a tire, and means for supporting said tire support structure and moving the tire support structure between a lower comfortable working height along side the worker position and an elevated position in which a J-hook in the conveyor system can be disengaged from a tire being delivered to the work station and engaged with a tire to be transported away from the work station.

2. The tire repair work station of claim 1 further comprising a work bench in the vicinity of the worker position.

* * * * *